Dec. 17, 1957  J. WEIBEL, JR  2,816,636
REFRIGERATING APPARATUS

Filed April 28, 1955  3 Sheets-Sheet 1

INVENTOR.
John Weibel, Jr.
BY
R R Candor
His Attorney

Dec. 17, 1957 J. WEIBEL, JR 2,816,636
REFRIGERATING APPARATUS
Filed April 28, 1955 3 Sheets-Sheet 2
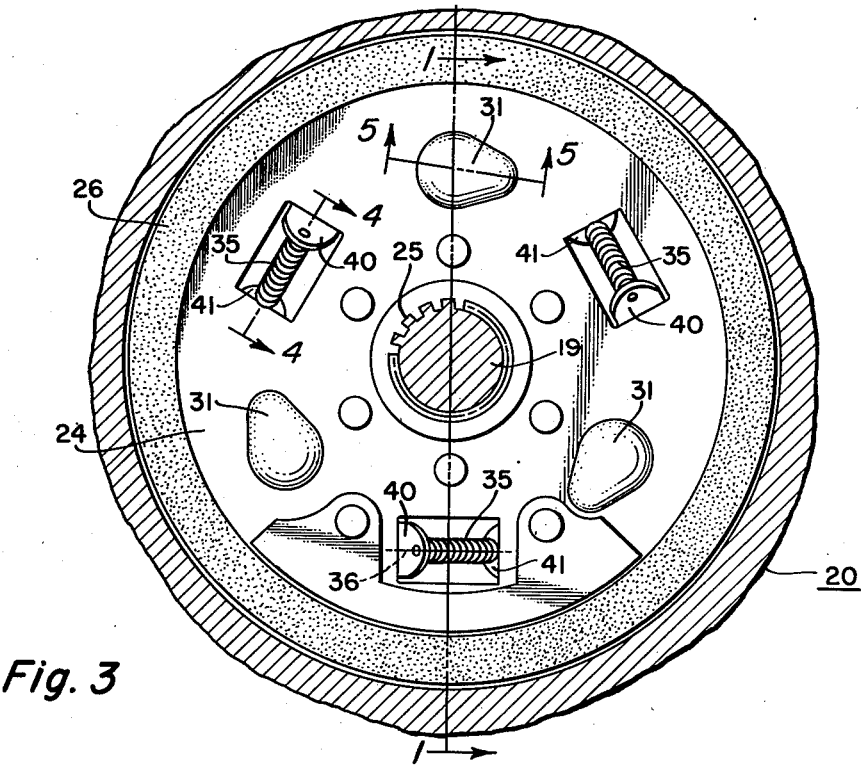
Fig. 3
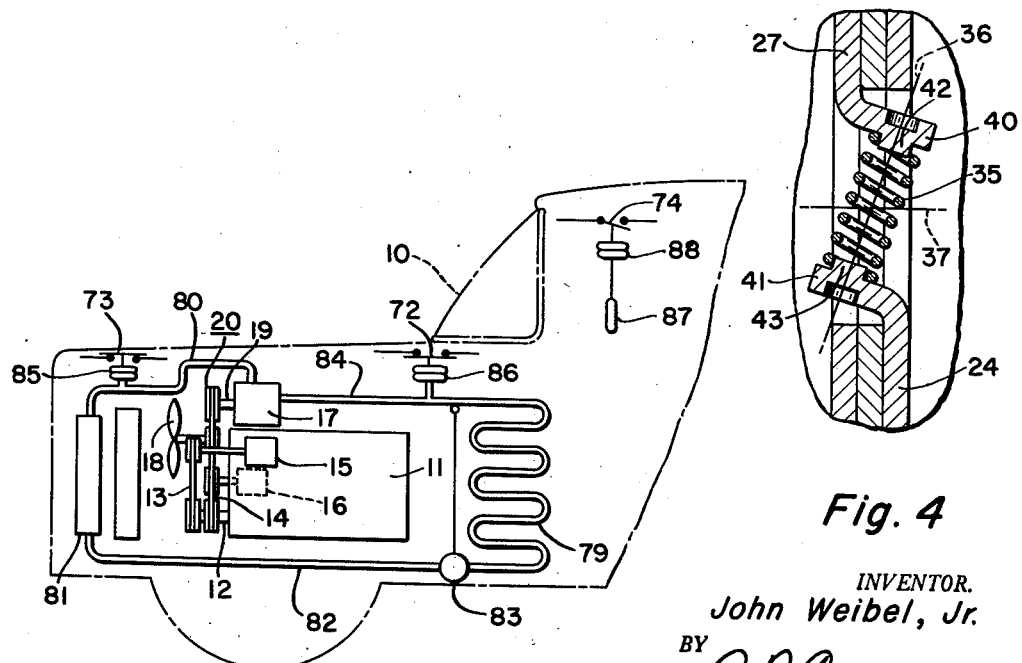
Fig. 6
Fig. 4
INVENTOR.
John Weibel, Jr.
BY R R Candor
His Attorney Dec. 17, 1957     J. WEIBEL, JR     2,816,636
REFRIGERATING APPARATUS
Filed April 28, 1955     3 Sheets-Sheet 3
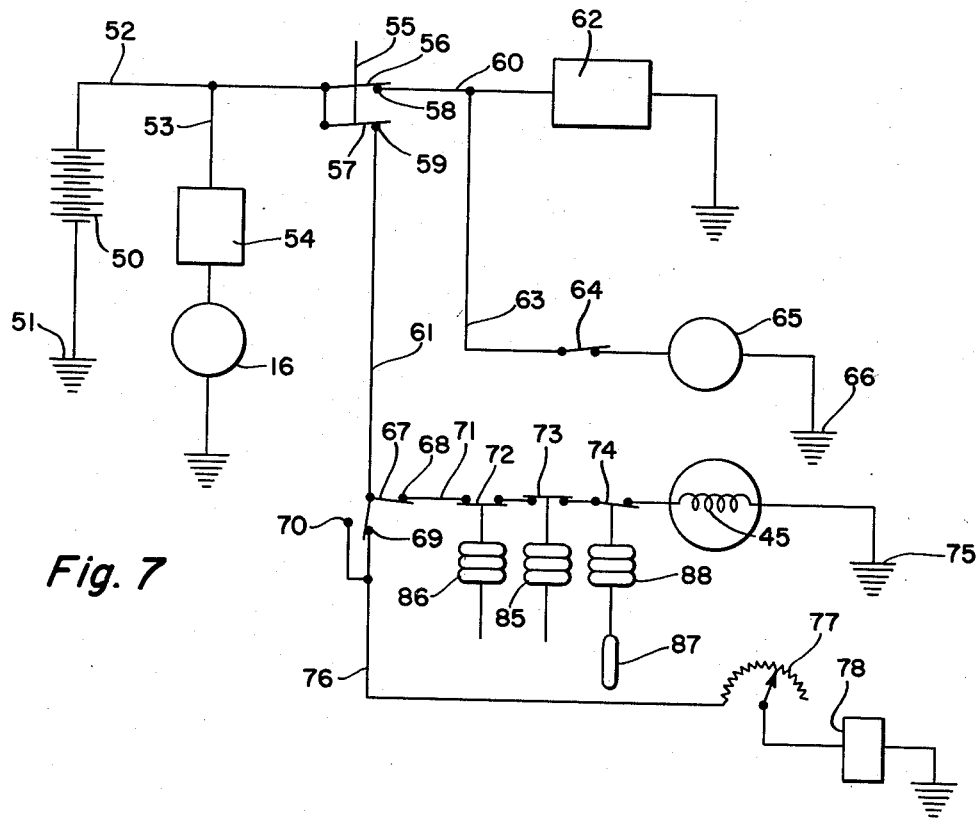
Fig. 7
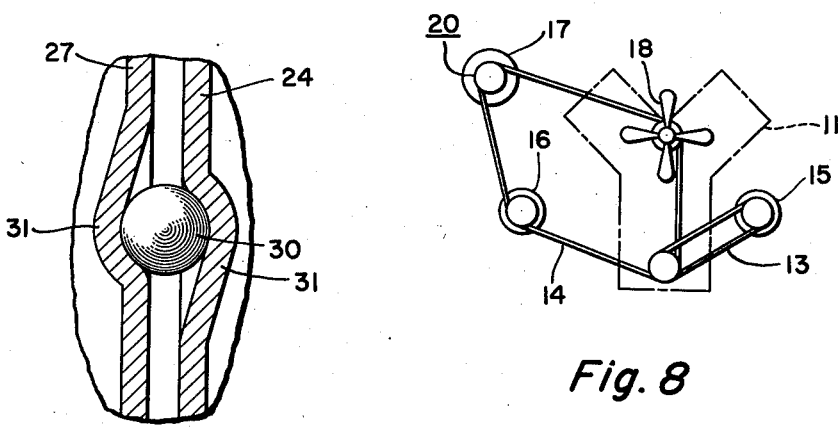
Fig. 5
Fig. 8
INVENTOR.
John Weibel, Jr.
BY R R Candor
His Attorney United States Patent Office 2,816,636
Patented Dec. 17, 1957

2,816,636

REFRIGERATING APPARATUS

John Weibel, Jr., Dayton, Ohio, assignor to General Motors Corporation, Detroit, Mich., a corporation of Delaware Application April 28, 1955, Serial No. 504,607

2 Claims. (Cl. 192—35)

This invention relates to refrigerating apparatus and more particularly to a clutch or power transmitting member adapted, for example, to be placed between an engine and a refrigerant compressor or the like.

An object of this invention is to provide a power transmitting member of the keyed disk and teaser disk type provided with springs between said disks having a tangential thrust tending to unlock said disks and having an axial thrust tending to move said disks toward each other.

Another object of this invention is to provide a power transmitting device of the keyed disk and teaser disk type with coil springs between said disks and having their axes substantially tangential to the axis of one of the power transmitting members, and tending to unlock said disks and having their axes also directed slightly axially of the axis of one of said power transmitting members and tending to move said disks toward each other.

Further objects and advantages of the present invention will be apparent from the following description, reference being had to the accompanying drawings wherein a preferred form of the invention is clearly shown.

In the drawings:

Figure 3 is a transverse cross-section taken along the line 3—3 of Figure 1.

Figure 4 is an enlarged cross-section taken along the line 4—4 of Figure 3.

Figure 5 is an enlarged cross-section taken along the line 5—5 of Figure 3.

Figure 6 is a diagrammatic representation of an automobile with an engine and refrigerating system mounted therein.

Figure 7 is a diagram of the wiring on the automobile.

Figure 8 is a diagrammatic front view of a portion of the automobile.

Figure 1:
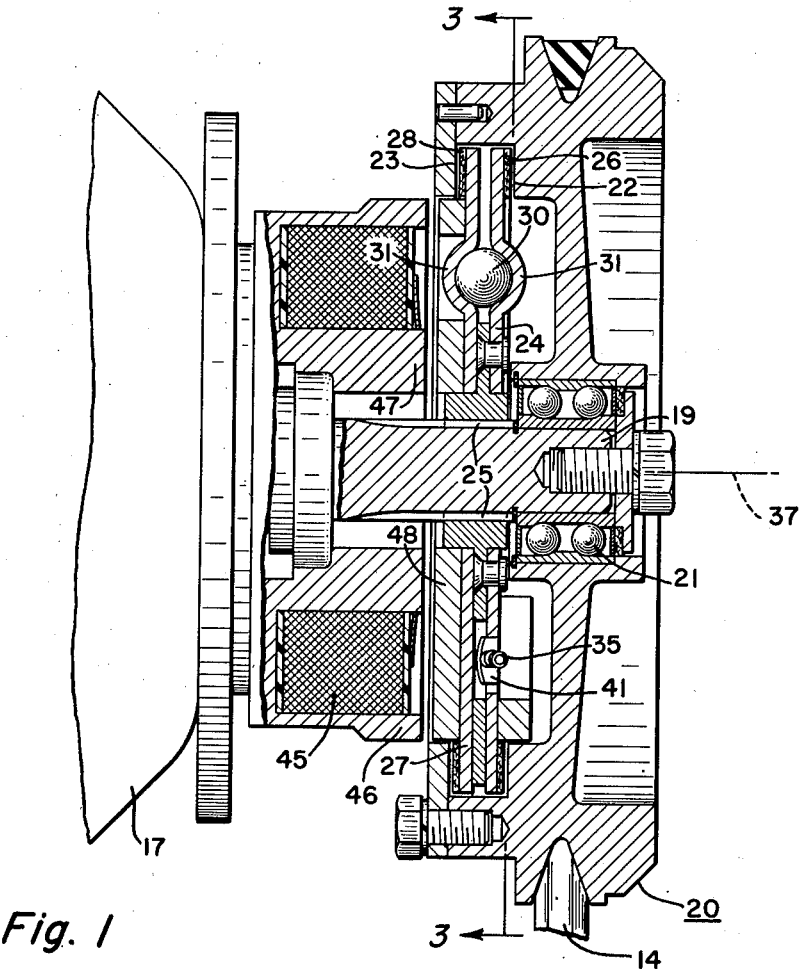
Figure 1 is a longitudinal cross-section of the power transmitting device or clutch taken substantially along the line 1—1 of Figure 3.
Figure 2:
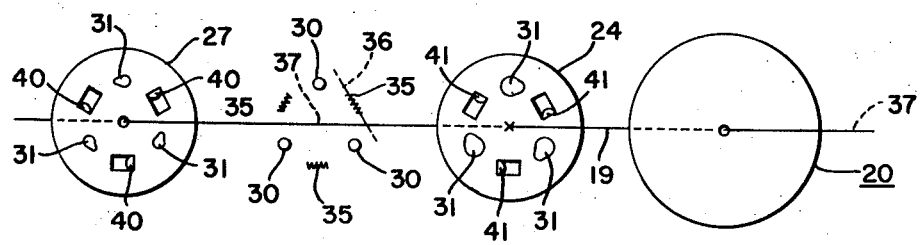
Figure 2 is a diagrammatic exploded view showing some of the members of the clutch.

An automobile 10 is provided with an engine 11 having a drive shaft which drives the belts 13 and 14. The belt 13 drives the power steering pump 15. The belt 14 drives the generator 16, compressor 17 and the combined water pump and fan construction 18.

The compressor 17 is provided with a driven shaft member 19 on which the wheel, pulley, or driving member 20 is mounted. The member 20 is axially fixed and rotationally free on shaft 19 by means of the ball bearing construction 21.

The driving member 20 has two inwardly directed drive surfaces 22 and 23. A clutch disk 24 is longitudinally movable on and keyed to the driven shaft 19 by means of the splines 25 and is engageable with the drive surface 22 through the medium of friction ring 26 preferably secured to the disk 24.

A teaser disk 27 is rotationally and longitudinally free about the driven shaft 19 and is engageable with the drive surface 23 through the medium of friction ring 28 preferably secured to the disk 27.

Spreader means are provided between the disks 24 and 27 for energizing them into locking engagement with the drive surfaces by relative rotation of the disks. Preferably such spreader means may take the form of a plurality of balls 30 between the disks 24 and 27 and grooves 31 on the disks 24 and 27. Springs 35 are provided between the disks having a tangential thrust with respect to the axis of shaft 19 tending to unlock the disks. Springs 35 also have an axial thrust with respect to the axis of shaft 19 tending to move said disks toward each other. Preferably, such springs may be coil springs, each having its axis 36 substantially tangential to the axis 37 of the shaft 19 to unlock the disks. Each of said coils also has its axis 36 directed slightly axially of the axis 37 of said shaft 19 as more clearly shown in Figure 4 and tending to move said disk toward each other and away from the inwardly directed drive surfaces 22 and 23.

Preferably the disk 27 has an extension 40, and the disk 24 has an extension 41 provided respectively with buttons 42 and 43 to receive the ends of the springs 35. Referring to Figures 3 and 4, the coil springs 35 assert a major tangential thrust tending to rotate the disks 27 and 24 relatively to each other in a direction to unlock the disks. The springs 35 also have a slight axial thrust tending to move the disks toward each other into the position shown in Figure 4.

A longitudinal actuator is provided for the teaser disk 27. This may take the form of a solenoid 45 having annular poles 46 and 47 which magnetically attract the armature 48 which is secured to the teaser disk 27.

When the power transmitting device is used to drive a refrigerant compressor, as heretofore described, it may be controlled by the wiring system shown in Figure 7. Such wiring system may include a battery 50 grounded at 51 and having a lead 52 which is connected to the generator 16 through the line 53 and voltage regulator 54. A combined ignition and air conditioning switch 55 has blades 56 and 57 simultaneously closing on and opening away from the contacts 58 and 59 to energize and de-energize the lines 60 and 61. The line 60 leads to the ignition system 62, and to a line 63 connected to the starter switch 64 leading to the starter motor 65, grounded at 66. The line 61 leads to the combined compressor and blower switch 67 which opens and closes with respect to the contacts 68, 69 and 70. When the contacts 68 and 69 are energized, both refrigeration and air circulation are provided. The line 71 is provided with switches 72, 73 and 74 which are in series with the solenoid 45 axially to actuate the teaser disk by the energization of the solenoid 45. The solenoid is grounded at 75.

The contacts 69 and 70, when energized, energize the blower line 76 connected to the rheostat 77 which is connected to the blower 78 for blowing air over the evaporator 79 of the refrigerating system to be described or to provide unrefrigerated air circulation, as desired.

The refrigerating system includes the compressor 17 which discharges compressed refrigerant through the conduit 80 to the condenser 81. Liquid refrigerant flows from the condenser 81 through the conduit 82 past the thermostatic expansion valve 83 to the refrigerant evaporator 79 from which evaporated refrigerant flows through the conduit 84 to the compressor 17. The bellows 85 is connected to the line 80 and opens the switch 73 when the condenser pressures are too high. The bellows 86 is connected to the conduit 84 and opens the switch 72 when the evaporator pressures drop to produce a temperature below the freezing temperature. A thermostatic bulb 87 is placed in the compartment to be conditioned and is connected to the bellows 88 and closes the switch 74 when the temperature in the compartment rises above a comfortable temperature. If desired, the switch 74 may be adjustable to vary the temperatures at which the switch opens and closes.

In operation, the switches 55 and 67 are closed, as shown in Figure 7. The engine may be started by closing the starter switch 64, after which the compressor 17 is driven as long as all of the switches 67, 72, 73 and 74 are closed to energize the solenoid 45. Energization of the solenoid 45 pulls the armature 48 and teaser disk 27 leftward in Figure 1, so that the friction ring 28 engages the inwardly directed surface 23. Since the disk 24 tends to be stationary when the compressor 17 is stationary, a relative rotation is produced between the disk 24 and 27 causing the spreader means or ball and groove constructions 30 and 31 to spread the disks apart and lock them against the inwardly directed surfaces 22 and 23 to drive the compressor 17. When the solenoid 45 is deenergized by the opening of any of the switches controlling it, the springs 35 move the disks 24 and 27 relatively toward each other and away from the surfaces 22 and 23 to unlock the disks. Because of the major tangential direction of the axes of the springs 35, a relatively strong force is produced by the springs tending to unlock the spreader means more effectively than do the spring constructions which are axial of the compressor shaft.

While the form of embodiment of the invention as herein disclosed constitutes a preferred form, it is to be understood that other forms might be adopted as may come within the scope of the claims which follow.

What is claimed is as follows:

1. A clutch comprising: a driven shaft; a driving member axially fixed and rotatable about and having a bearing on said driven shaft, said driving member having two inwardly directed drive surfaces; a clutch disk longitudinally movable on and keyed to said driven shaft and engageable with one of said drive surfaces; a teaser disk coaxial with said clutch disk and longitudinally movable on the axis of said driven shaft and engageable with the other of said drive surfaces; spreader means between said disks energized into locking engagement by relative rotation of said disks; skewed coil springs between said disks positioned with their axes at a small angle relative to the plane of the disks and having tangential thrust parallel to the periphery of the disks tending to unlock said disks and having an axial thrust parallel to the axis of the driven shaft tending to move said disks toward each other; and a longitudinal actuator for said teaser disk.

2. An apparatus of the character described comprising: a shaft member; a wheel member axially fixed and rotatable about and having a bearing on said shaft member; said wheel member having two inwardly directed drive surfaces, one of said members being a power giving member and the other of said members being a power receiving member; a disk longitudinally movable on and keyed to said shaft member and engageable with one of said inwardly directed surfaces; a teaser disk coaxial with said first named disk and longitudinally movable on the axis of said shaft member and engageable with the other of said drive surfaces; spreader means between said disks energized into locking engagement by relative rotation of said disks; skewed compression type coil springs between said disks positioned at a small angle relative to the planes of the disks and having a tangential thrust parallel to the periphery of the disks tending to unlock said disks and having an axial thrust parallel to the axis of the shaft member tending to move said disks toward each other and away from said inwardly directed drive surfaces; the complementary clutch and teaser disks each having one spring support for one end of each spring with the supports of each disk located beyond the supports of the complementary disk in the direction parallel to the axis of the shaft member, and a longitudinal actuator for said disks.

References Cited in the file of this patent

UNITED STATES PATENTS

| | | |
|---|---|---|
| 1,906,733 | Bendix | May 2, 1933 |
| 2,138,129 | Wolfrom | Nov. 29, 1938 |
| 2,308,679 | Eason | Jan. 19, 1943 |
| 2,605,877 | Winther | Aug. 5, 1952 |
| 2,649,941 | Doebeli | Aug. 25, 1953 |